United States Patent [19]

Foss et al.

[11] Patent Number: 5,379,426
[45] Date of Patent: Jan. 3, 1995

[54] METHOD AND APPARATUS FOR OBJECT ORIENTED INTERPROCESS MESSAGE SWITCHING

[75] Inventors: Carolyn L. Foss, Palo Alto; Dwight F. Hare, Menlo Park; Richard F. McAllister, Palo Alto; Tin A. Nguyen, Danville; Amy Pearl, Mountain View; Sami Shalo, Palo Alto, all of Calif.

[73] Assignee: Sun Microsystems, Inc., Mountain View, Calif.

[21] Appl. No.: 247,519

[22] Filed: May 23, 1994

Related U.S. Application Data

[63] Continuation of Ser. No. 646,357, Jan. 25, 1991, abandoned.

[51] Int. Cl.$^6$ .............................................. G06F 13/00
[52] U.S. Cl. ................................... 395/650; 395/700; 364/DIG. 1; 364/241.7; 364/284; 364/284.3; 364/280; 364/281.3; 364/229; 364/229.2
[58] Field of Search .............. 364/DIG. 1, 241.7, 940, 364/940.9; 395/650

[56] References Cited

U.S. PATENT DOCUMENTS

| | | | |
|---|---|---|---|
| 4,412,285 | 10/1983 | Neches et al. | 364/200 |
| 4,466,060 | 8/1984 | Riddle | 364/200 |
| 4,630,196 | 12/1986 | Bednar, Jr. et al. | 364/200 |
| 5,060,150 | 10/1991 | Simor | 364/200 |
| 5,093,914 | 3/1992 | Coplien et al. | 395/700 |
| 5,095,522 | 3/1992 | Fujita et al. | 395/200 |
| 5,179,708 | 1/1993 | Gyllstrom et al. | 395/725 |
| 5,212,792 | 5/1993 | Gerety et al. | 395/650 |

Primary Examiner—Kevin A. Kriess
Assistant Examiner—Johnathan Hall Backenstose
Attorney, Agent, or Firm—Blakely Sokoloff Taylor & Zafman

[57] ABSTRACT

A method and apparatus for object oriented interprocess message switching between a sender process and a plurality of receiver processes is disclosed. A sender process may address object oriented messages to a plurality of objects without knowing the identities of programs that handle or observe the object operations defined by the object types of the addressee objects, whether these programs are being executed, and how to start their execution if they are not being executed. Object operations defined by object types may be inherited from predecessor object types. Inherited object operations may also be overridden for "pre-processing" and "post-processing". One handler process and any number of observer processes are selected for each object oriented message. Handler processes are selected for object oriented notice messages as well as object oriented request messages and vice versa. Executing as well as non-executing processes (i.e. programs) are selected. The sender process and the receiver processes may be executed on the same different computers in a network.

28 Claims, 9 Drawing Sheets

REQUEST ROUTING

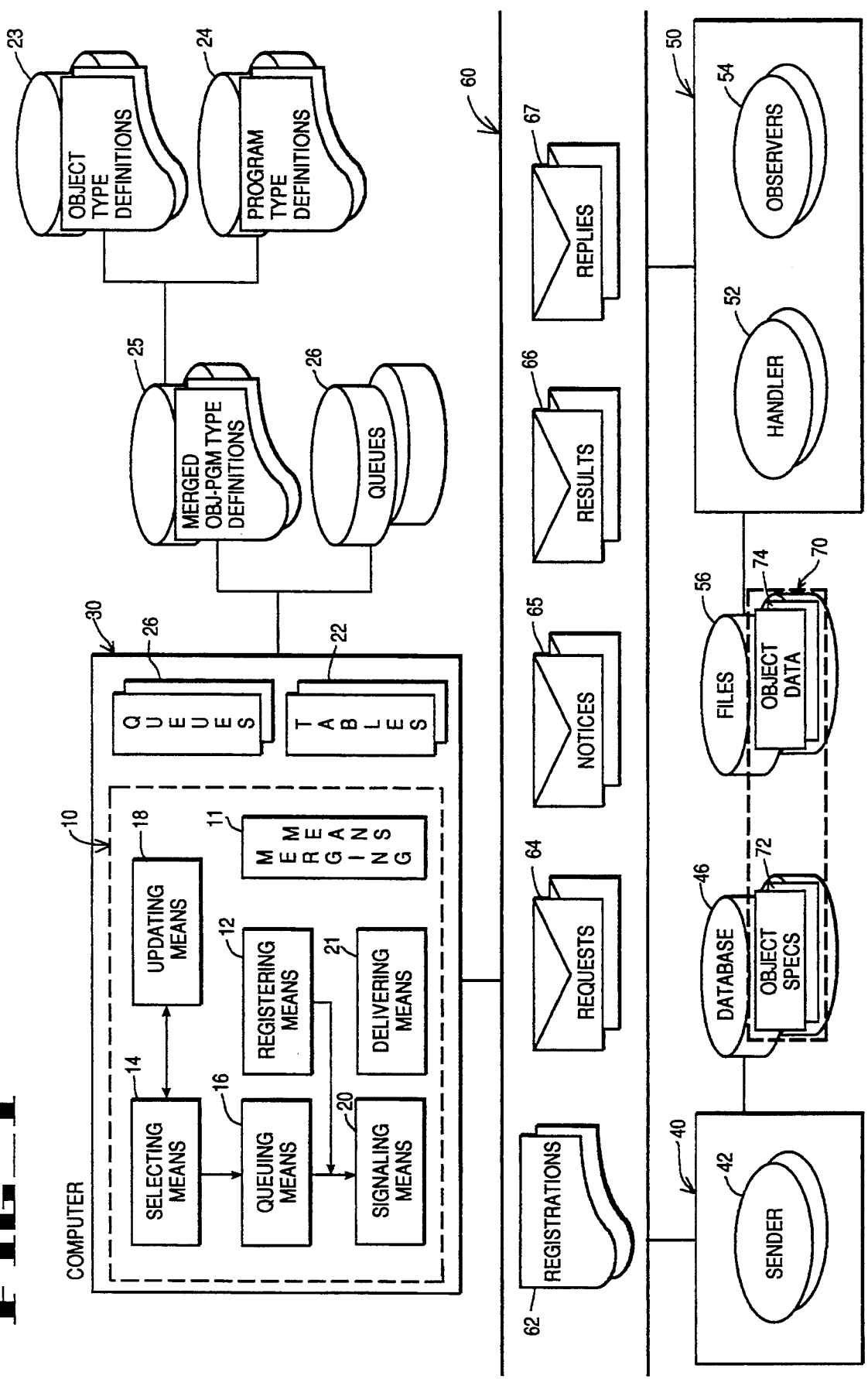

FIG. 2E  MERGED OBJECT TYPE AND PROGRAM TYPE DEFINITIONS

```
OTYPE-PTYPE STARCALC {                                    ~710

START: "USR/BIN/STARCALC";

HANDLE:     (STARCALCCELL, GALAXYCALCCELL) PUT_CONTENTS   ~720
               (IN STRING S) → QUEUE;
               (STARCALCCELL) DISPLAY ( ) → START;           ~740

OBSERVE:    (STARCALCCELL, GALAXYCALCCELL) LINK_ADDED     ~760
               (IN NODE LINKOID) ..;
}

OTYPE-PTYPE GALAXYCALC {                                  ~610

START: "USR/BIN/GALAXYCALC";

HANDLE:     (GALAXYCALCCELL (STARCALCCELL)) DISPLAY ( )   ~620
               → START;
               (GALAXYCALCCELL) COMPUTE (IN STRING FORMULA,  ~640
               OUT FLOAT RESULT) → START;
```

700 ↑ (box)
722, 724, 726, 728, 748, 746, 744, 742, 762, 764, 766, 768

600 ↑ (box)
622, 623, 624, 626, 628, 642, 644, 646, 648

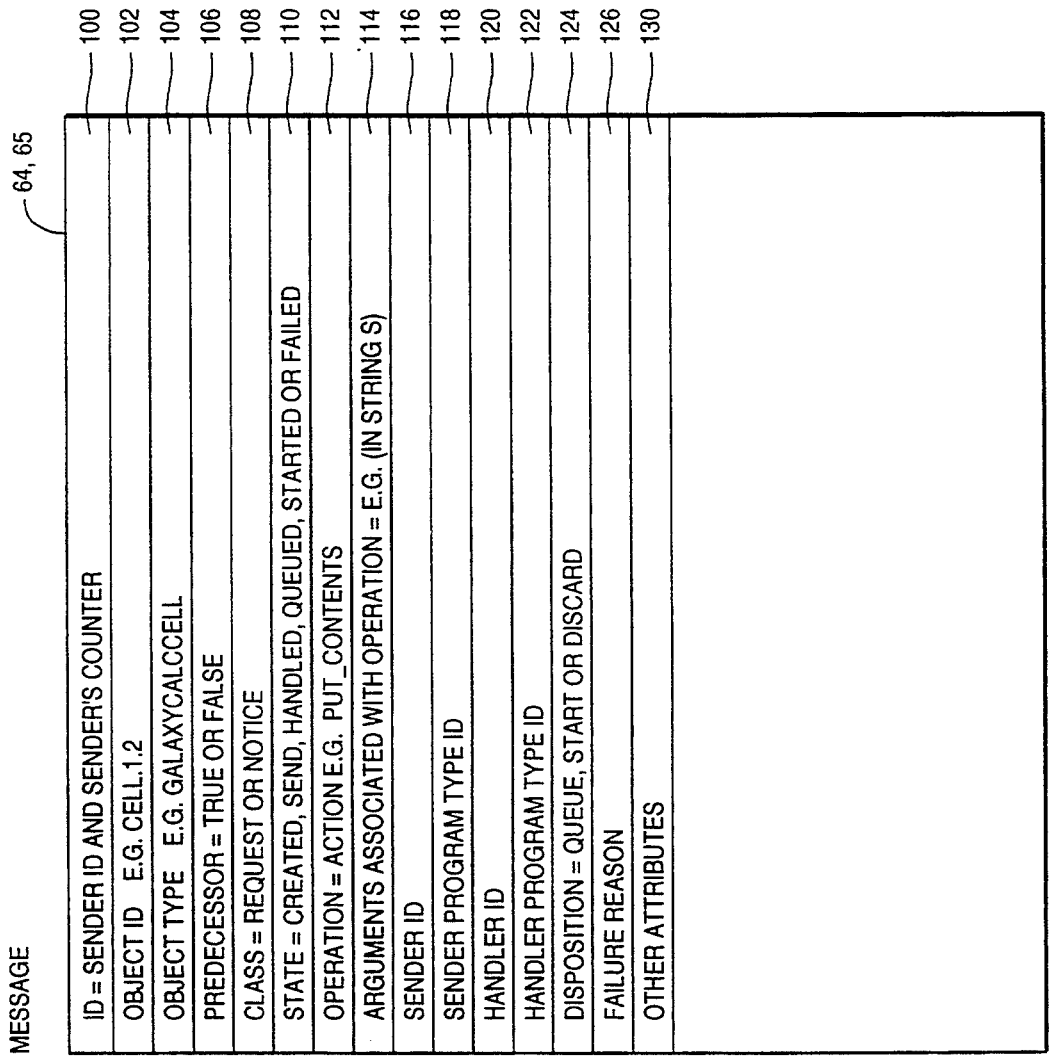
FIG._5

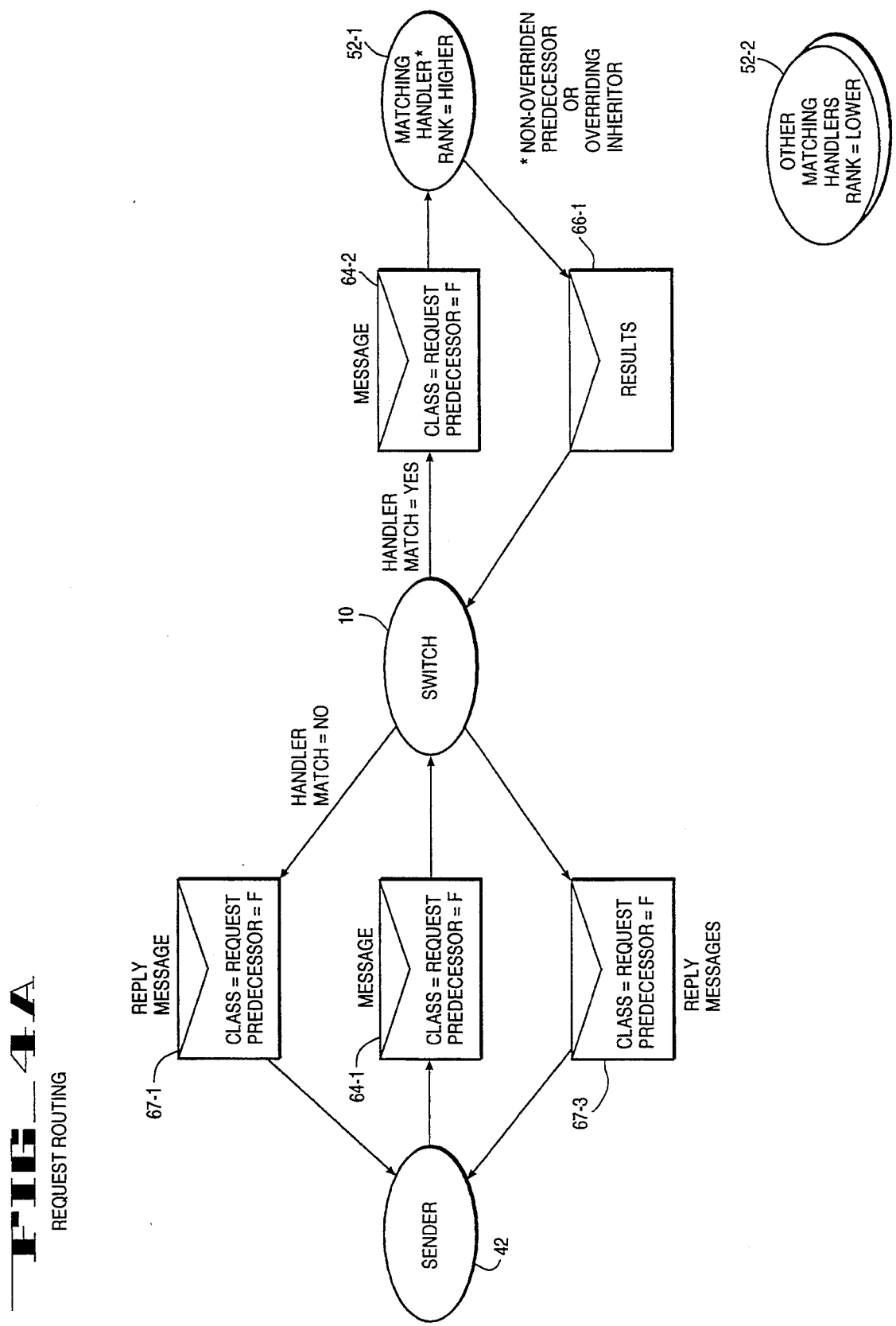

REQUEST ROUTING (CONT'D)

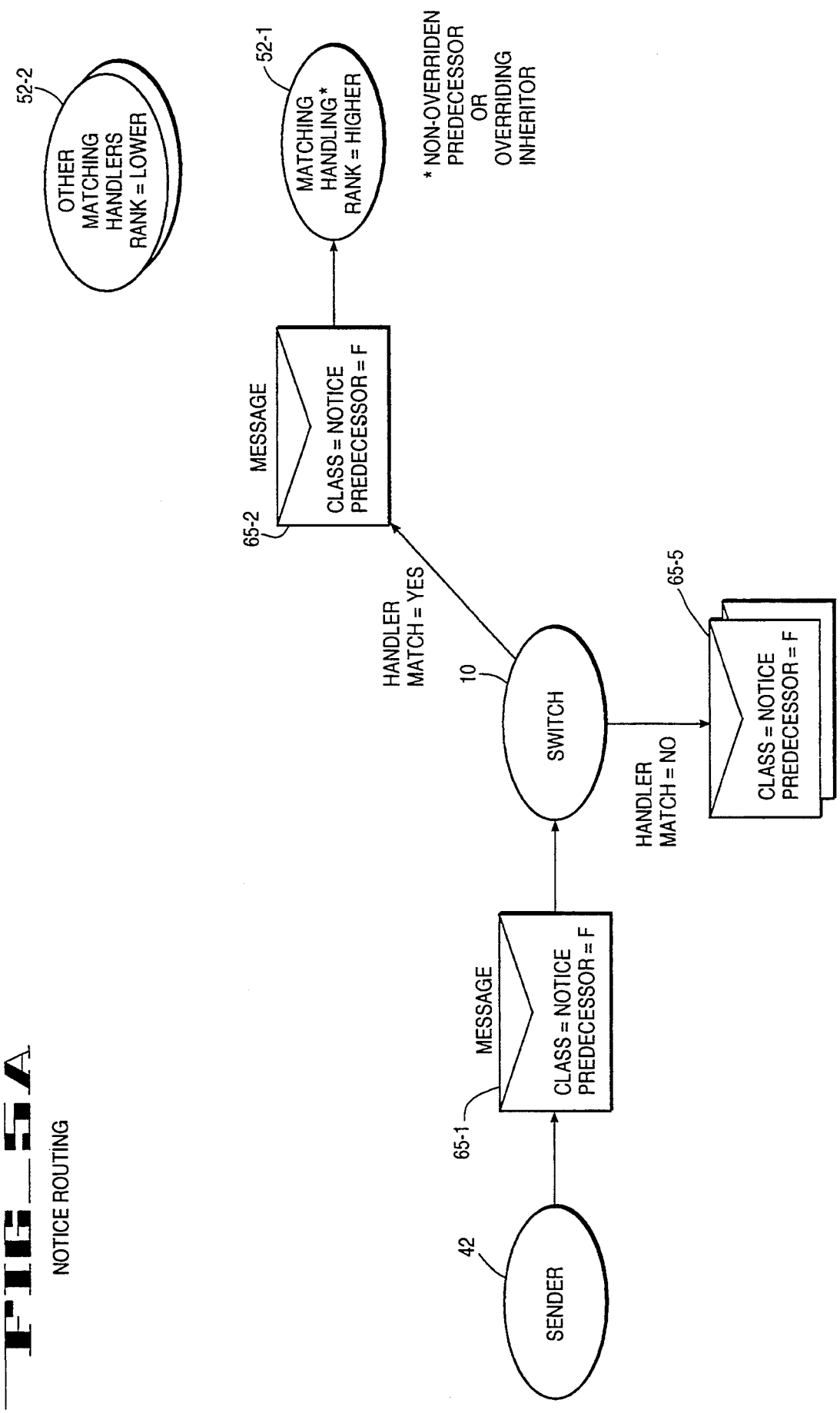

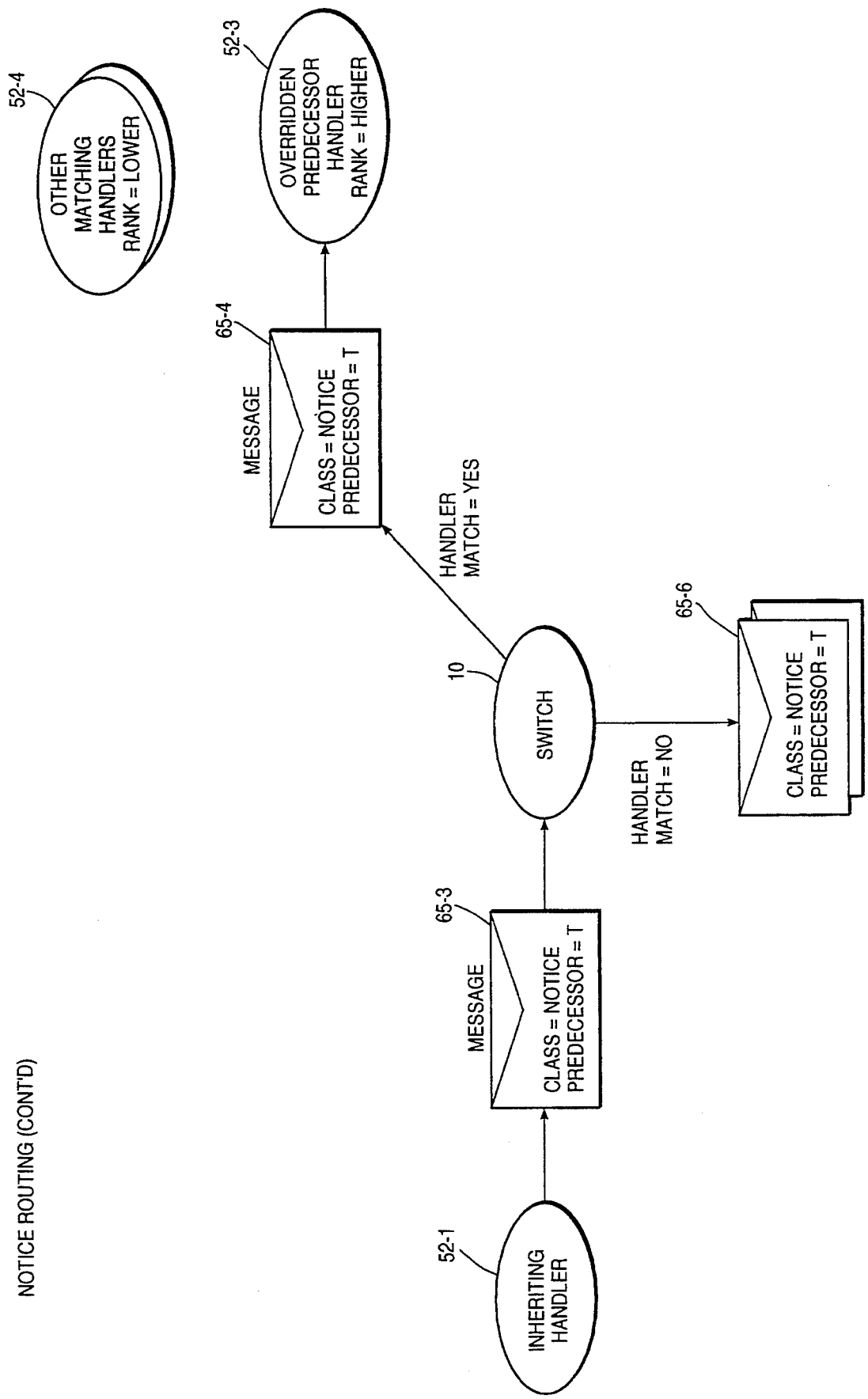

METHOD AND APPARATUS FOR OBJECT ORIENTED INTERPROCESS MESSAGE SWITCHING

This is a continuation of application Ser. No. 07/646,357, filed Jan. 25, 1991 now abandoned.

BACKGROUND OF THE INVENTION

1. Field of the Invention

The present invention relates to the field of computer systems. In particular, the present invention is a method and apparatus for object oriented interprocess message switching between a sender process and a plurality of receiver processes.

2. Art Background

Conventional interprocess communication facilities are process oriented. Absent from conventional facilities is the ability for a sender process to address a message not to a receiver process, but to an object.

The term object comes from the programming methodology known as object-oriented programming. An object is a package of data and operations which object users can invoke to manipulate the data. Each object has an object type. The object type definition defines the object operations that can be performed on objects of that particular object type. The object operations are implemented independent of the objects themselves. Additionally, one object type may inherit the object operations defined and implemented for other object types. For further information on object-oriented design and programming techniques, see B. Meyer, *Object-oriented Software Construction,* (Prentice Hall, 1988), pp. 65-372.

A process is a copy or an instance of a program, an executable file, in the process of execution. A process uses an object by requesting an object operation defined. The requesting process has no knowledge of how the object operations are implemented and is unaffected by any changes to the implementation of the object operations. Typically, under the prior art, the requesting process requests an object operation to be performed by calling a procedure or function that performs the object operation, directly through an interprogramming call. The operation is performed in the requesting process.

The absence of object oriented message addressing has hindered the development of cooperative multiprocess applications which manage a plurality of objects in a network. Without object oriented message addressing, a process that wishes, for example, to display a drawing, must know not only the identity of the drawing, but the identity of the program that can display the drawing, whether a process is executing the program, and how to start execution of the program, if the program is not being executed. Furthermore, the process must also know the identities of other programs that need to be notified regarding the request to have the drawing displayed and/or the outcome of the request, i.e. the drawing was displayed or failed to be displayed. Likewise, the process must also know whether there are processes executing these programs that need to be notified, and how to start execution of these programs, if they are not being executed.

Making all programs being executed by cooperative multiprocess applications executing on a network aware of each other is a burdensome task, and has not been done in practice. As will be described, the present invention overcomes the disadvantages of the prior art, and provides a method and apparatus for object oriented interprocess message switching between a sender process and a plurality of receiver processes.

SUMMARY OF THE INVENTION

It is therefore an object of the present invention to provide object oriented interprocess message switching between a sender process and a plurality of receiver processes.

It is another object of the present invention that a sender process may address the object oriented messages to objects, without knowing the identities of the programs executed by the receiver processes, whether the programs are being executed, and how to start execution of these programs if they are not being executed.

These objects are realized by the method and apparatus of the present invention for object oriented interprocess message switching between a sender process and a plurality of receiver processes. The preferred embodiment of the method comprises the steps of merging object type definitions and program type definitions, registering a program type identifier for each of the receiver processes with an apparatus for object oriented interprocess message switching, selecting the receiver processes to receive object oriented messages received from the sender process, queuing copies of the received object oriented messages for the selected receiver processes, executing or non-executing, signaling the selected receiver processes regarding the availability of the queued object oriented messages, and delivering the queued object oriented messages when requested by the signaled receiver processes, to the requesting receiver processes. The apparatus comprises various means for accomplishing the steps of merging, registering, selecting, queuing, signaling, and delivering.

For disposing the received object oriented messages, the preferred embodiment of the method further comprises the steps of registering the sender process, discarding object oriented notice messages and replying to object oriented request messages. Likewise, the apparatus further comprises various means for accomplishing the steps of registering, discarding and replying.

For replying to object oriented request messages with no selected handler processes, the preferred embodiment of the method further comprises the steps of generating reply messages by updating the object oriented request messages with selection results, queuing copies of the reply messages for the sender process, signaling the sender process regarding the availability of the queued reply messages, and delivering the queued reply messages when requested by the signaled process. Similarly, the apparatus further comprises various means for accomplishing the steps of updating, selecting, signaling and delivering.

For replying to object oriented request messages with selected handler processes, the preferred embodiment of the method further comprises the steps of queuing an additional copy of each of the object oriented request messages pending results, and dequeuing the result pending object oriented request messages upon receipt of the handling results from the handler processes, prior to the steps of updating, selecting, signaling, and delivering described above. Additionally, the reply messages are generated by updating the object oriented request messages with handling results. Similarly, the apparatus further comprises various means for accomplishing the steps of queuing and dequeuing.

Object type definitions comprise object type identifiers and object operation handle and observe signatures. Object operation signatures may be explicit or inheriting. Program type definitions comprise program type identifiers, and start up parameters. Merged object type-program type definitions comprise program type identifiers, start up parameters, merged object oriented message handle and observe signatures.

Registration of the receiver processes comprises registering program type identifiers, signaling ways and object oriented message patterns. Registration of the sender process comprises registering signaling ways. Receiver and sender processes may register dynamically at their initialization or some later points during their execution.

Object oriented messages comprise a plurality of message attributes describing the messages. Message attributes comprise a message identifier, a message object identifier attribute, a message object type attribute, and a message predecessor attribute. Message attributes further comprise a message class, a message state, a message operation attribute, and a message operation argument attribute. Message classes comprise "Request" and "Notice". Message states comprise "Created", "Sent", "Handled", "Queued", "Started" and "Failed".

Selection comprises selecting at most one handler process and any number of observer processes for each object oriented message. Both handler processes and observer processes are selected regardless of message class. Both executing as well as non-executing processes are selected. Predecessor processes and inheriting processes are selected accordingly depending on the nature of inheritance. Processes are selected by matching message attributes. Matchings are performed against registered object oriented message signatures contained in merged object type-program type definitions and object oriented message patterns.

BRIEF DESCRIPTION OF THE DRAWINGS

FIG. 1 is a block diagram illustrating the method of the present invention for object oriented interprocess message switching between a sender process and a plurality of receiver processes.

FIG. 2a, 2b, and 2c are block diagrams illustrating exemplary object type definitions comprising object type identifiers and object operation signatures, exemplary program type definitions comprising program type identifiers and start up parameters, and exemplary merged object type-program type definitions comprising program type identifiers, start up parameters, and object oriented message signatures.

FIG. 3 is a block diagram illustrating an exemplary object oriented message comprising a plurality of message attributes specifying a message identifier, an object identifier, an object type identifier, an object operation code and a set of object operation arguments.

FIG. 4a and 4b are block diagrams illustrating routing of object oriented request messages to the predecessor and inheriting processes.

FIG. 5a and 5b are block diagrams illustrating routing of object oriented notice messages to the predecessor and inheriting processes.

NOTATIONS AND NOMENCLATURE

Figure 2A:
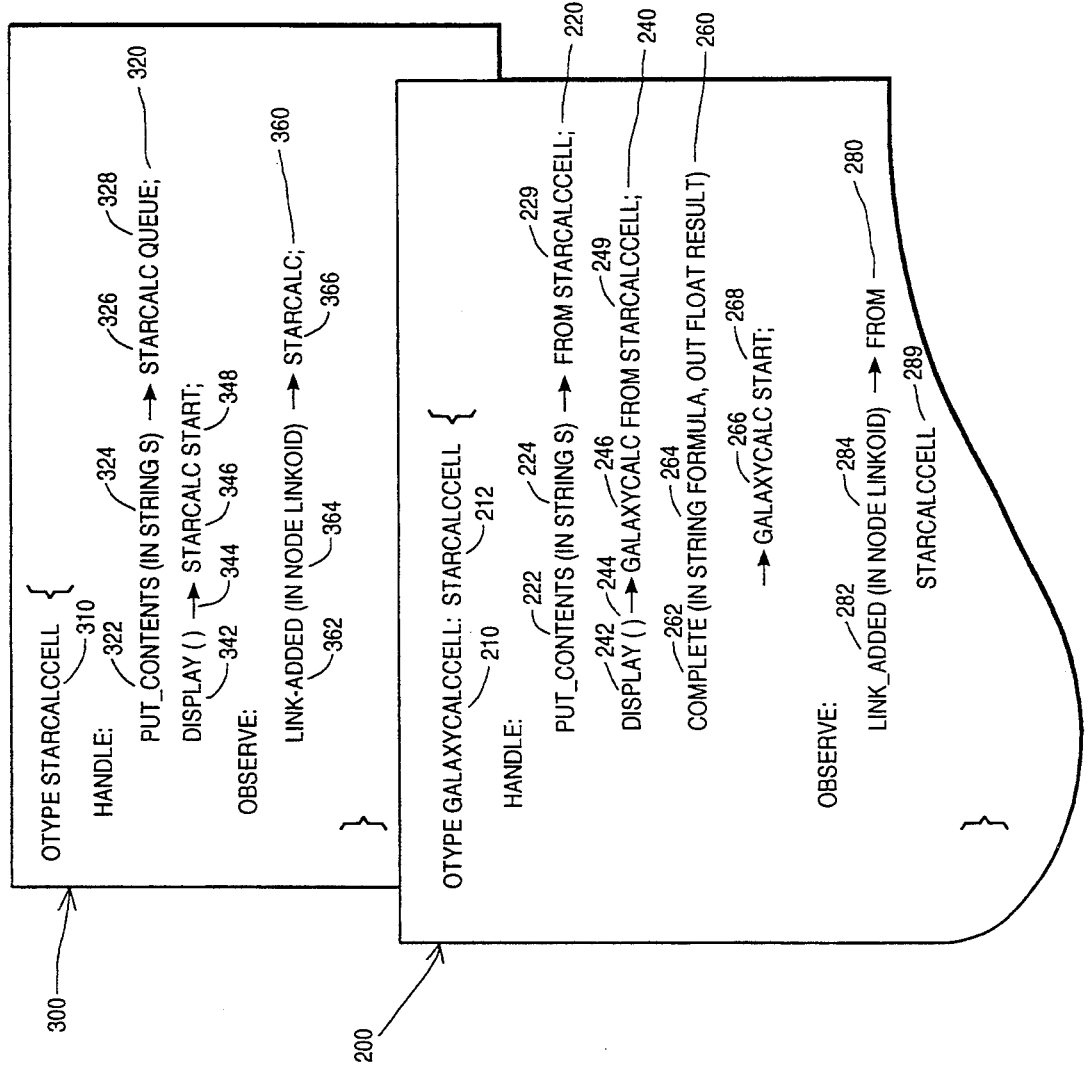

The detailed description which follows is presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind that the distinction between the method operations in operating a computer and the method of computation itself. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The algorithms presented herein are not entirely related to any particular computer or other apparatus. In particular, various general purpose machines may be used with programs written in accordance with the teaching herein, or it may prove more convenient to construct more specialized apparatus to perform the required method steps. The required structure for a variety of these machines will appear from the description given below.

GLOSSARY

A process is an instance of execution of a program.

A handler process of an object oriented message is a process who handles the object oriented message. One handler process is selected for each object oriented message.

An observer process of an object oriented message is a process who wants to observe or be informed of the object oriented message. Any number of observer process may be selected for each object oriented message.

An object type definition defines one or more object operations that can be performed on objects of a particular object type. The handler/observer program that handles/observes the object operation may be explicitly defined or inherited with or without override.

A program type definition defines a program including the program's start up parameters.

A program type identifier identifies a program type definition, as well as a merged object type-program type definition.

DETAILED DESCRIPTION OF THE INVENTION

A method and apparatus for object oriented interprocess message switching having particular application for switching object oriented messages between a sender process and a plurality of receiver processes being executed by one or more computers in a network is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

1. Overview

Referring now to FIG. 1, a block diagram of the preferred embodiment of the apparatus for object oriented interprocess message switching of the present invention 10 is shown. The apparatus 10 is shown in the context of a plurality of computers 30, 40, 50 connected to a network 60. The network of computers 30, 40, 50 comprises a plurality of sender processes 42 sending object oriented messages 64, 65 to and getting reply messages 67 from a a plurality of receiver processes 52, 54. The receiver processes 52, 54 comprise handler processes 52 and observer processes 54. The objected oriented messages 64, 65 are addressed to the objects 70, and comprise request messages 64 and notice messages 65.

Objects 70 are comprised of two parts, data 72 and specification 74. An object's data part 72 is an object maker defined portion of a file and has associated object operations that can be invoked on it. An object's spec part 74 contains properties of an object's data part 72, typically includes the object type, the object maker and the file containing the object's data. The associated object operations for an object type are defined in the object type definitions 23.

The preferred embodiment of the apparatus for interprocess message switching of the present invention 10 comprises a merging means 11 comprising an interface (not shown) for receiving object type definitions 23 and program type definitions 24 as inputs and outputting the merged object type-program type definitions 25, a registering means 12 comprising an interface (not shown) for receiving registrations 62 as inputs from the processes 42, 52, 54, a selecting means 14 comprising an interface (not shown) for receiving object oriented messages 64, 65 as inputs from the sender process 42, a queuing means 16 coupled to the selecting means 14, an updating means 18 coupled to the selecting means 14 and comprising an interface (not shown) for receiving results 66 as inputs from the handler processes 52, a signaling means 20 coupled to the registering means 12 and the queuing means 16 for outputing signals to the processes 42, 52, 54, and a delivering means 21 comprising an interface (not shown) for receiving acknowledgements from the processes 42, 52, 54 as inputs, and outputting the object oriented messages 64, 65 to the receiver processes 52, 54 and the reply messages 67 to the sender processes 42, 52, 54.

2. Merging Means

Continuing referring to FIG. 1, the merging means 11 is used for merging object type definitions 23 and program type definitions 24. The merging means 11 comprises an interface (not shown) for receiving the object type definitions 23 and the program type definitions 24 as inputs. Upon receipt of the inputs, the merging means 11 outputs the merged object type-program type definitions 25.

The merging means may be implemented with any well known sort/merge techniques. Preferably, the techniques chosen are adapted, factoring in the syntax used for the object type definitions 23 and the syntax used for the program type definitions 24, to facilitate fast merging. For further information on sort/merge techniques, see Knuth, *Sorting and Searching, The Art of Computer Programming*, Vol. 3, (Addison-Wesley, 1973), pp. 73-348.

a. Object Type Definitions

Referring now to FIG. 2a, a block diagram illustrating two exemplary object type definitions 200, 300 is shown. Object type definitions 200, 300 are used to define one or more object operations that can be performed on objects of each of the particular object types. Each object type definition 200, 300 comprises an object type identifier 210, 310 and at least one object operation signature 220, 240, 260, 280, 320, 340, 360. The object type identifiers 210, 310 identify the object types and their associated object type definitions 200, 300. Each object operation signature 220, 240, 260, 280, 320, 340, 360 defines an object operation for the particular object types.

Object operation signatures comprise object operation handle signatures 220, 240, 260, 320, 340 and object operation observe signatures 280, 360. The object operation handle signatures 220, 240, 260, 320, 340 define the handle object operations for objects of the particular object types, and the handler programs for the handle object operations being defined. Each handle object operation is handled by at most one handler process executing the handler program being defined for the particular handle object operation. The object operation observe signatures 280, 360 define the observe object operations for objects of the particular object types, and the programs to be notified regarding the observe object operations being defined. Each observe object operation may be observed by any number of observe processes executing the observer program being defined for the particular observe object operation. Selection of handler and observer processes will be discussed in further details later in conjunction with the selecting means.

Object operation handle/observe signatures may be specified explicitly 260, 320, 340, 360. Each explicit object operation signature comprises an object operation pattern, a program type identifier 266, 326, 346, 366. Each object operation pattern comprises an object operation code 262, 322, 342, 362 and a set of object operation arguments 264, 324, 344, 364. Additionally, each explicit object operation signature may further comprise an object operation disposition 268, 328, 348.

The object operation patterns specify the object operations being defined for the object types. The program type identifiers 266, 326, 346, 366 specify the programs that handle or observe the object operations specified by the object operation patterns. The optional object operation dispositions 268, 328, 348 specify dispositions of requests or notices of the object operations being defined, if no processes are executing the programs specified by the program type identifiers 266, 326, 346, 366 when the requests or notices are received by the apparatus for object oriented interprocess message switching of the present invention.

The dispositions comprise "queue"s 328, "start"s 268, 348 and "discard"s. A "queue" disposition 328 specifies that an object operation request is to be queued, pending a process executing the program identified by the program type identifier 326. A "start" disposition 268, 348 specifies that a handler process is to be started executing the program identified by the program type identifier 266, 346. A "discard" disposition specifies that an object operation request is to be discarded. The "discard" disposition is the defaulted disposition, when no disposition is specified.

Alternatively, object operation handle/observe signatures may be inheriting 220, 240, 280. Inheriting object operation signatures are used to allow object types to define object operations using programs previously developed for the same object operations defined for predecessor object types. Each inheriting object operation signature comprises an object operation pattern, and a predecessor object type identifier 229, 249, 289. Similar to an explicit object operation signature, an object operation pattern comprises an object operation code 222, 242, 282 and a set of object operation arguments 224, 244, 284.

The object operation patterns serve the same function as previously discussed. The predecessor object type identifiers 229, 249, 289 identify predecessor object type definitions 300 where the predecessor program type identifiers 326, 346, 366 and the predecessor object operation request dispositions 328, 348 (or the defaulted disposition) are to be inherited for the object operation signatures 220, 240, 280. Each inheriting object operation is handled/observed by the predecessor handler/observer processes executing the predecessor handler/observer programs.

Additionally, an inheriting object operation signature 240 may override the predecessor object operation signature 340. An overriding inheriting object operation signature 240 is used to define an overriding handler/observer program for a handle/observe object operation, in addition to the inherited predecessor handler/observer program. An overriding inheriting object operation signature 240 further comprises a program type identifier 246. The program type identifier 246 in an overriding inheriting object operation signature specifies the overriding program. Each overridden object operation is handled/observed by the overriding program before being handled/observed by the inherited predecessor program.

An overriding program may be used to provide preprocessing in addition to the processing provided by the inherited predecessor program. Upon completion of the pre-processing, the overriding program, by re-sending the object operation to the object oriented interprocess message switch with the message predecessor attribute set, causes the overridden object operation to be handled/observed by the predecessor handler/observer program. By resending the object operation as request, the overriding program may also be used to provide post-processing for the overridden object operation, upon receipt of the reply message to the request. The message predecessor attribute and the routing of request and notice messages between overriding and predecessor processes will be discussed in further details later.

It will be understood that an inheriting object operation signature may inherit from a predecessor object operation signature that is an inheriting object operation signature itself. An object type definition, in addition to adding and overriding object operation signatures of a predecessor object type as described above, may inherit from a subset of object operation signatures of a predecessor object type definition. Furthermore, an object type definition may also inherit, override, or add to object operation signatures in multiple predecessor object types at the same time.

The object operation handle/observe signatures may be implemented in any syntax. Preferably, the syntax used is friendly to the programmers who develop the handler programs that perform the object operations and convenient for the merging means to parse.

Continuing referring to FIG. 2a, two exemplary object type definitions 200, 300 are shown. The first exemplary object type definition "galaxycalccell" 200 comprises three exemplary object operation handle signatures 220, 240 260 and one exemplary object operation observe signature 280. The second exemplary object type definition "starcalccell" 300 comprises two object operation handle signatures 320, 340 and one exemplary object operation observe signature 360.

The first exemplary object operation handle signature 220 in the first object type definition "galaxycalccell" 200 is an inheriting object operation handle signature. The signature 200 specifies that object type "galaxycalccell" 210 is to have an object operation "put_contents(in string s)" 220. Furthermore, the object operation "put_contents(in string s)" 220 for object type "galaxycalccell" 210 is to be handled by the predecessor handler program "starcalc" 326 for the same object operation defined for the predecessor object type "starcalccell" 310. Additionally, the object operation is to inherit the predecessor disposition of "queue" 328 for the same object operation.

The second exemplary object operation signature 240 in the first object type definition "galaxycalccell" 200 is an overriding inheriting object operation handle signature. The signature 240 specifies that object type "galaxycalccell" 210 is to have an object operation "display()" 224. Furthermore, the object operation "display()" 224 for object type "galaxycalccell" 210 is to be handled by the handler program "galaxycalc" 246 before being handled by the predecessor handler program "starcalc" 346 for the same object operation defined for the predecessor object type "starcalccell" 310. Additionally, the object operation is to inherit the predecessor disposition of "start" 348 for the same object operation.

The third exemplary object operation signature 260 in the first object type definition "galaxycalccell" 200 is an explicit object operation handle signature. The signature 260 specifies that, while the object type "galaxycalccell" 210 is inheriting some of the object operation handle/observe signatures 220 240, 280 from the predecessor object type definition "starcalccell" 310, the object type "galaxycalccell" 210 is to have an additional object operation handle signature of "compute(in string formula, out float result)>galaxycalc start" 260.

The fourth exemplary object operation signature 280 in the first object type definition "galaxycalccell" 200 is an inheriting object operation observe signature. The signature 280 specifies that object type "galaxycalccell" 210 is to have an object operation "link_added(in node linkoid)" 280. Furthermore, the object operation "link_added(in node linkoid)" 280 for object type "galaxycalccell" 210 is to be observed by the predecessor observer program "starcalc" 366 for the same object operation defined for the predecessor object type "starcalccell" 310. Additionally, the object operation is to inherit the predecessor disposition of "discard" (by default).

Similarly, the first exemplary object operation handle signature 320 in the second object type definition "starcalccell" 300 is an explicit object operation handle signature. The signature 320 specifies that the object type "starcalccell" 310 is to have an object operation of "put_contents(in string s)" 320. Furthermore, the object operation "put_contents(in string s)" 320 is to be handled by the handler program "starcalc" 326. Additionally, the object operation is to have an object operation disposition of "queue" 328.

The second exemplary object operation signature 340 in the second object type definition "starcalccell" 300 is an explicit object operation handle signature. The signature 340 specifies that the object type "starcalccell" 310 is to have an object operation "display()" 340. Furthermore, the object operation "display()" 340 for object type "starcalccell" 310 is to be handled by the handler program "starcalc" 346. Additionally, the object operation is to have an object operation disposition of "start" 348.

The third exemplary object operation signature 360 in the second object type definition "starcalccell" 300 is an explicit object operation observe signature. The signature 360 specifies that the object type "starcalccell" 310 is to have an object operation "link_added(in node linkoid)" 360. Furthermore, the object operation "link_added(in node linkoid)" for object type "starcalccell" 310 is to be observed by the observer program "starcalc" 366. Additionally, the object operation is to have an object operation disposition of "discard" (by default).

b. Program Type Definitions

Figure 2B:
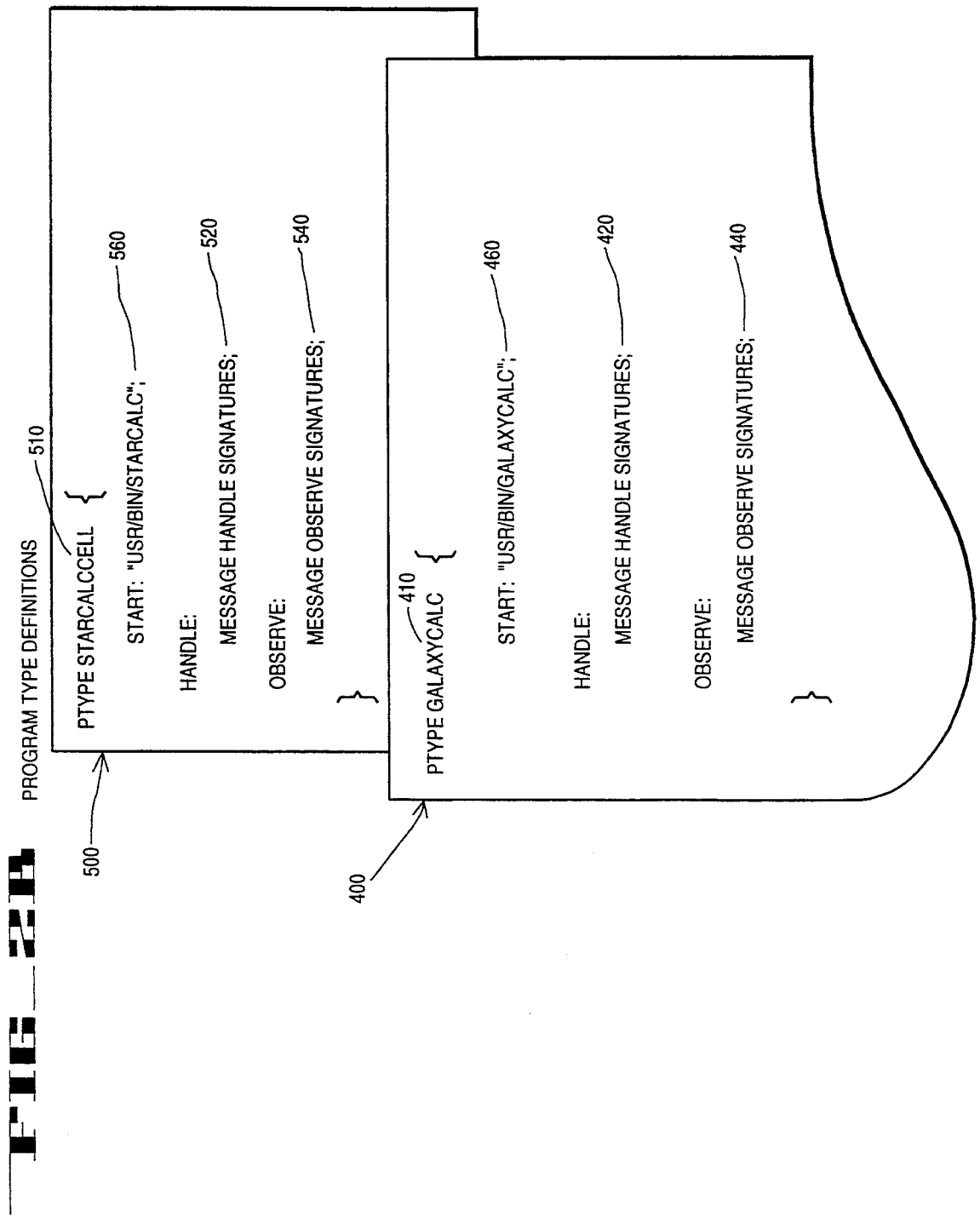

Referring now to FIG. 2b, a block diagram illustrating two exemplary program type definitions 400, 500 is shown. Program type definitions 400, 500 are used to define handler and observer programs. Definitions comprise identification, start up parameters and messages to be handled and/or observed by the programs being defined. Each program type definition 400, 500 comprises a program type identifier 410, 510, a set of start up parameters 460, 560 and optionally one or more message signatures 420-440, 520-540. Message signatures comprise message handle signatures 420, 520 and message observe signatures 440, 540. Each message handle/observer signature 420-440, 520-540 comprises a message pattern (not shown) and a message disposition attribute (not shown). Each message pattern comprises a plurality of message attributes (not shown).

For further information on program type definitions, program type identifiers, program start up parameters, message signatures, and message patterns and message dispositions contained therein, see the Specification in co-pending U.S. patent application, Ser. No. 07/627,735, filed on Dec. 14, 1990, assigned to the assignee of the present Application, Sun Microsystems Inc., entitled *A Method and Apparatus for Interprocess Message Switching*, which is hereby fully incorporated by reference.

c. Merged Object Type-Program Type Definitions

Referring now to FIG. 2c, a block diagram illustrating two exemplary merged object type-program type definitions is shown. The merged object type-program type definitions 600, 700 are used by the selecting means to facilitate fast selection of processes for object oriented messages. The merged object type-program type definitions 600, 700 are organized by program type identifiers 610, 710 and comprise the definitions in the object type definitions and the object type definitions.

In addition to the program type identifiers 610, 710, each merged object type-program type definition 600, 700 further comprises the set of start up parameters 690, 790, and the message signatures (not shown) from the corresponding program type definitions (see FIG. 2a). Additionally, each merged object type-program type definition 600, 700 further comprises at least one merged object oriented message signatures 620, 640, 720, 740, 760. Each merged object oriented message signature 620, 640, 720, 740, 760 comprises at least one of the object type identifiers 622, 642, 722, 742, 762, one of the object operation codes 624, 644, 724, 744, 764, one of the object operation arguments 626, 646, 726, 746, 766 and one of the object operation dispositions 628, 648, 728, 748, 768 from the corresponding object operation signatures and object type definitions (see FIG. 2b).

The merged object oriented message signatures 620, 640, 720, 740, 760 are created by first merging the object type identifiers into the object operation signatures. The merged explicit object operation signatures are carried forward as merged object oriented message signatures 640 without further merging. The merged inheriting object predecessor object operation signatures that do not override their merged predecessor object operation signatures are further merged into their merged predecessor object operation signatures to create the merged object oriented message signatures 720, 760. The merged inheriting object predecessor object operation signatures that override their predecessor object operation signatures are not merged into their merged overridden predecessor object operation signatures. The merged overriding inheriting object operation signatures and the merged overridden predecessor object operation signatures are carried forward separately to create separate merged object oriented message signatures 740, 620. Additionally, the overridden predecessor object type identifiers 623 are merged into the merged object oriented message signatures 620 created from the overriding inheriting object operation signature.

Continuing referring to FIG. 2c, two exemplary merged object type-program type definitions 600, 700 resulted from merging the object type definitions in FIG. 2a and the program type definitions in FIG. 2b, are shown. The merged object oriented message handle signature of "(galaxycalccell) compute(in string formula, out float result)>start" 640 is an exemplary merged object oriented message handle signature resulted from explicit object operation handle signature. As previously described, the "compute" object oriented message signature is defined for the object type "galaxycalccell" only.

The merged object oriented message handle signature of "(starcalccell, galaxycalccell) put_contents(in string s)>queue" 720, and the merged object oriented message observe signature of "(starcalccell, galaxycalccell) link_added(in node linkoid)>" 760, are exemplary merged object oriented handle/observe signatures resulted from inheriting object operation handle/observe signatures that do not override their corresponding predecessor object operation handle/observe signatures. As previously described, the object oriented message handle signature of "put_contents" and the object oriented message observe signature of "link_added" for the inheriting object type "galaxycalccell" are to be handled/observed by the predecessor program "starcalc" that handles/observes the same objected oriented message handle/observe signatures for the predecessor object type "starcalccell".

The merged object oriented message handle signature of "(starcalccell) display()>start" 740 and the merged object oriented handle signature of "(galaxycalccell(-starcalccell)) display()>start" 620 are exemplary merged object oriented message signatures resulted from inheriting object operation handle signatures that override their corresponding predecessor object operation handle signatures. As previously described, the object oriented message handle signature of "display" for the overriding inheriting object type "galaxycalccell" is to be handled by the program "galaxycalc" before being handled by the predecessor program "starcalc" that handles the same object oriented message handle signature for the predecessor object type "starcalccell".

3. Registering Means

Referring to FIG. 1 again, the registering means 12 is for registering receiver processes 52, 54 with the apparatus of the present invention 10. Registration of receiver processes 52, 54 comprises registering a program type identifier and at least one signaling way for each of the receiver processes 52, 54. Additionally, registration of receiver processes 52, 54 may further comprise registering a plurality of object oriented as well as non-object oriented message patterns for each of the receiver processes 52, 54.

The program type identifier identifies to the apparatus 10 the program type of the program being executed by the registering receiver process 52, 54. The registering means 12 generates object oriented message patterns from the merged object type-program type definitions 25 for the program type identified by the program type identifiers received, and stores them in tables 22 for subsequent use by the selecting means 14. The signaling ways describe to the apparatus 10, how the registering receiver process 52, 54 is to be signaled regarding the availability of a message 64, 65, 67. Similarly, the registering means 12 stores the signaling ways received in tables 22 for subsequent use by the signaling means 20. The object oriented message patterns describe to the apparatus 10, the object oriented messages 64, 65, 67 which the registering receiver process 52, 54 is to receive. Likewise, the registering means 12 stores the object oriented message patterns received in tables 22 for subsequent use by the selecting means 14.

While a receiver process 52, 54 may register object oriented message patterns, it will be appreciated that having the object oriented message patterns generated through the merged object type-program type definitions 25 has the advantage of having a central repository where object users may find out what object operations may be invoked for a certain object type. For further information on the registering means, registrations comprising program type identifiers, signaling ways, and message patterns, also see the incorporated Specification in co-pending U.S. patent application, Ser. No. 07/627,735, filed on Dec. 14, 1990, assigned to the assignee of the present Application, Sun Microsystems Inc., entitled *A Method and Apparatus for Interprocess Message Switching*.

4. Object Oriented Message

Referring now to FIG. 3, a block diagram illustrating exemplary message attributes used by the apparatus of the present invention for describing an object oriented messages 64, 65 is shown. Each object oriented message 64, 65 comprises a message identifier 100 and at least one object oriented message attribute 102–104. The object oriented message attributes 102–104 comprise a message object identifier attribute 102 and a message object type attribute 104.

Additionally, an object oriented message 64, 65 may further comprise a message predecessor attribute 106, a message class attribute 108, a message state attribute 110, a message operation attribute 112, a message operation argument attribute 114, a message sender identifier 116, a message sender program type identifier 118, a message handler identifier 120, a message handler program type identifier 122, a message disposition attribute 124, and a message failure reason attribute 126.

The message identifier 100 uniquely identifies the message 64, 65. The unique message identifier 100 may be constructed in a variety of manners. Preferably, the unique message identifier 100 comprises a sender computer identifier, a sender process identifier and a sender process specific message identifier, such as a message counter, for example, Sextant.712.0001.

The message object identifier attribute 102 identifies the addressee object of an object oriented message. Similarly, the object identifier may also be constructed in a variety of manners, e.g. "Cell,1.2". The message object type 104 identifies the object type of the addressee object. Likewise, the object type may be constructed in a variety of manners, e.g. "Galaxycalccell".

The message predecessor attribute 106 describes to the selecting means whether the message object type 104 is to be used for selection of receiver processes or the predecessor object type is to be used. The object type 104 is used when the message predecessor attribute 106 is not set, i.e. equaling "False", and the predecessor object type is used when the message predecessor attribute 106 is set, i.e. equaling "True".

The message class attribute 108 describes the message class of the object oriented message 64, 65. Preferably, message class comprise a class of request message and a class of notice message. The message state attribute 110 describes the status of the object oriented message 64, 65. Preferably, message states comprise a state of "Created", a state of "Sent", a state of "Handled", a state of "Queued", a state of "Started" and a state of "Failed". The message operation attribute 112 describes the operation associated with the object oriented message 64, 65, e.g. "Put_Contents". The message argument attribute 114 describes the operation arguments associated with the operation, e.g. "in string s".

The message disposition attribute 124 describes the disposition of the object oriented message 64, 65, in the event that no executing registered process is executing the program which is to receive the object oriented message 64, 65 (i.e. message signatures matched). Preferably, the message dispositions 124 comprise a disposition of "Queued", a disposition of "Started", and a defaulted disposition of "Discard" if no disposition is specified.

For further information on message attributes, also see the incorporated Specification in co-pending U.S. patent application, Ser. No. 07/627,735, filed on Dec.

14, 1990, assigned to the assignee of the present Application, Sun Microsystems Inc., entitled *A Method and Apparatus for Interprocess Message Switching.*

5. Selecting Means

Continuing referring to FIG. 1, the selecting means 14 is for selecting the receiver processes 52, 54 to receive object oriented messages 64, 65 received by the apparatus of the present invention 10 from the sender processes 42. Selection comprises selecting at most one handler process 52 and any number of observer processes 54 for each object oriented message 64, 65 received from a sender process 42. A handler process 52 is selected for each object oriented notice message 65 as well as for each object oriented request message 64. Likewise, observer processes 54 are selected for each object oriented request message 64 as well as for each object oriented notice message 65. Additionally, non-executing receiver processes (i.e. programs) are selected as well as executing receiver processes.

The selecting means 14 selects the receiver processes 52, 54 for an object oriented message 64, 65 by matching the message attributes in the object oriented message 64, 65 against the object oriented message patterns stored in tables 22 and merged object oriented message signatures in the merged object type-program type definitions 25. Additionally, if only the object identifier is provided, and the object type identifier is not provided, the selecting means 14 fills in the object type by looking up the object type from the object specs 72 based on the object identifier provided, prior to performing the matching. Furthermore, if the message predecessor attribute is set, the predecessor object type is used for matching instead of the message object type.

While a handler process 52 and any of member of observer process 54 may be selected for an object oriented message 64 or 65, it will be appreciated that typically only one handler/observer process 52 or 54 is selected for each object oriented message 64 or 65, due to the inherent characteristics of object type definitions. For further information on the selecting means, selection of receiver processes, and matching message attributes against signatures, also see the incorporated Specification in co-pending U.S. patent application, Ser. No. 07/627,735, filed on Dec. 14, 1990, assigned to the assignee of the present Application, Sun Microsystems Inc., entitled *A Method and Apparatus for Interprocess Message Switching.*

6. Queuing, Signaling, and Delivering Means

Referring to FIG. 1 again, the queuing means 16 is for queuing copies of the object oriented messages 64, 65 with selected receiver processes 52, 54. The queuing means 16 being coupled to the selecting means 14 queues copies of the object oriented messages 64, 65 with executing selected receiver processes 52, 54 for subsequent retrieval by these processes. The queuing means 16 also queues copies of the object oriented messages 64, 65 with non-executing selected receiver processes (i.e. programs), if the message disposition attributes are "queue".

The signaling means 20 is for signaling the selected receiver processes 52, 54 regarding the availability of an object oriented message 64, 65. The signaling means 20 signals the executing receiver processes 52, 54 when the receiver processes 52, 54 are selected and copies of the object oriented messages 64, 65 are queued. The signaling means 20 signals the pending receiver processes when the pending receiver processes 52, 54 with matching program types register their program type identifiers with the apparatus, typically at the initialization of the receiver processes 52, 54. It will be understood that receiver processes 52, 54 being started by the apparatus 10 do not have to be signaled. The starting receiver processes 52, 54 are "signaled" as part of the start up process.

The delivering means 21 is for dequeuing the queued object oriented messages 64, 65 and delivering the object oriented messages 64, 65 to the selected receiver processes 52, 54. The delivering means 21 comprises an interface (not shown) for receiving acknowledgements from the receiver processes 52, 54 as inputs, indicating that the receiver processes 52, 54 are ready to receive the queued object oriented messages 64, 65. Upon receipt of the acknowledgments, the delivering means 21 dequeues the queued object oriented messages 64, 65 and delivers the object oriented messages 64, 65 to the acknowledging receiver processes 52, 54.

For further information on the queuing means 16, the signaling means, and the delivering means 21, also see the incorporated Specification in co-pending U.S. patent application, Ser. No. 07/627,735, filed on Dec. 14, 1990, assigned to the assignee of present Application, Sun Microsystems Inc., entitled *A Method and Apparatus for Interprocess Message Switching.*

7. Replies

Continuing referring to FIG. 1, the apparatus for object oriented interprocess message switching of the present invention 10 also provides specific support for providing reply messages 67 to the object oriented request messages 64. Reply messages 67 are generated by updating object oriented request messages 64 with results of the requests. No reply messages 67 are generated for object oriented notice messages 65.

The apparatus 10 provides an additional updating means 18 and additional specific support in the queuing means 16. The registering means 12, the selecting means 14, the signaling means 20, and the delivering means 21 are also used to support the reply messages 67, but no additional supports are required in these means. It will be understood that separate registering means 12, selecting means 14, queuing means 16, signaling means 20, and delivering means 21 may be used.

a. Updating Means

The updating means 18 is for generating reply messages 67 to object oriented request messages 64. Additionally, the updating means 18 is also for discarding the object oriented notice messages 65 with no receiver processes 52, 54. The updating means 18 coupled to the selecting means 14 receives selection results from the selecting means 14 as input. The updating means 18 also comprises an interface (not shown) for receiving handling results from the handler processes 52.

Upon receipt of selection results indicating failure to select handler processes for the object oriented request messages 64, the updating means 18 generates the reply messages 67. The updating means 18 generates reply messages 67 by updating the object oriented request messages 64. Updating comprises updating the message state attributes to "Failed" and the message failure reason attributes.

Upon receipt of handling results 66 from the handler processes 52, the updating means 18 dequeues the results pending object oriented request messages 64 from results pending messages queues 26 and generates the reply messages 67 according to the handling results 66 received. Similarly, the updating means 18 generates the reply messages 67 by updating the object oriented request messages 64. Updating comprises updating the message state attributes to "Handled" or "Failed". Updating may further comprises updating the message failure reason attributes.

b. Other Means

For replying to the object oriented request messages 64, the registering means 12 is also for registering the sender process 42. Registration of sender process comprises registering at least one signaling way for the sender process 42.

The selecting means 14 is also for selecting any number of observer processes 54 to receive the reply messages 67. Non-executing observer processes are selected as well as executing observer processes. The queuing means 16 is also for queuing additional copies of the object oriented request messages 64 with selected handler processes 52, pending receipt of handling results 66 from the handler processes 52, and queuing copies of the reply messages 67 for the original sender processes 42 and any selected observer processes 54.

The signaling means 20 is also for signaling the original sender processes 42, and the selected executing observer processes 54 regarding the availability of the queued reply messages 67. The delivering means 21 is also for dequeuing and delivering the queued reply messages 67 upon request of the signaled processes 42, 54.

While observer processes 54 may be selected for reply messages 67, it will be appreciated that typically no observer process 54 will be selected, due to the inherent characteristics of object type definitions. For further information on replying to request messages, also see the incorporated Specifications in co-pending U.S. patent application, Ser. No. 07/627,735, filed on Dec. 14, 1990, assigned to the assignee of the present Application, Sun Microsystems Inc., entitled *A Method and Apparatus for Interprocess Message Switching*.

8. Request Routing

Figure 4B:
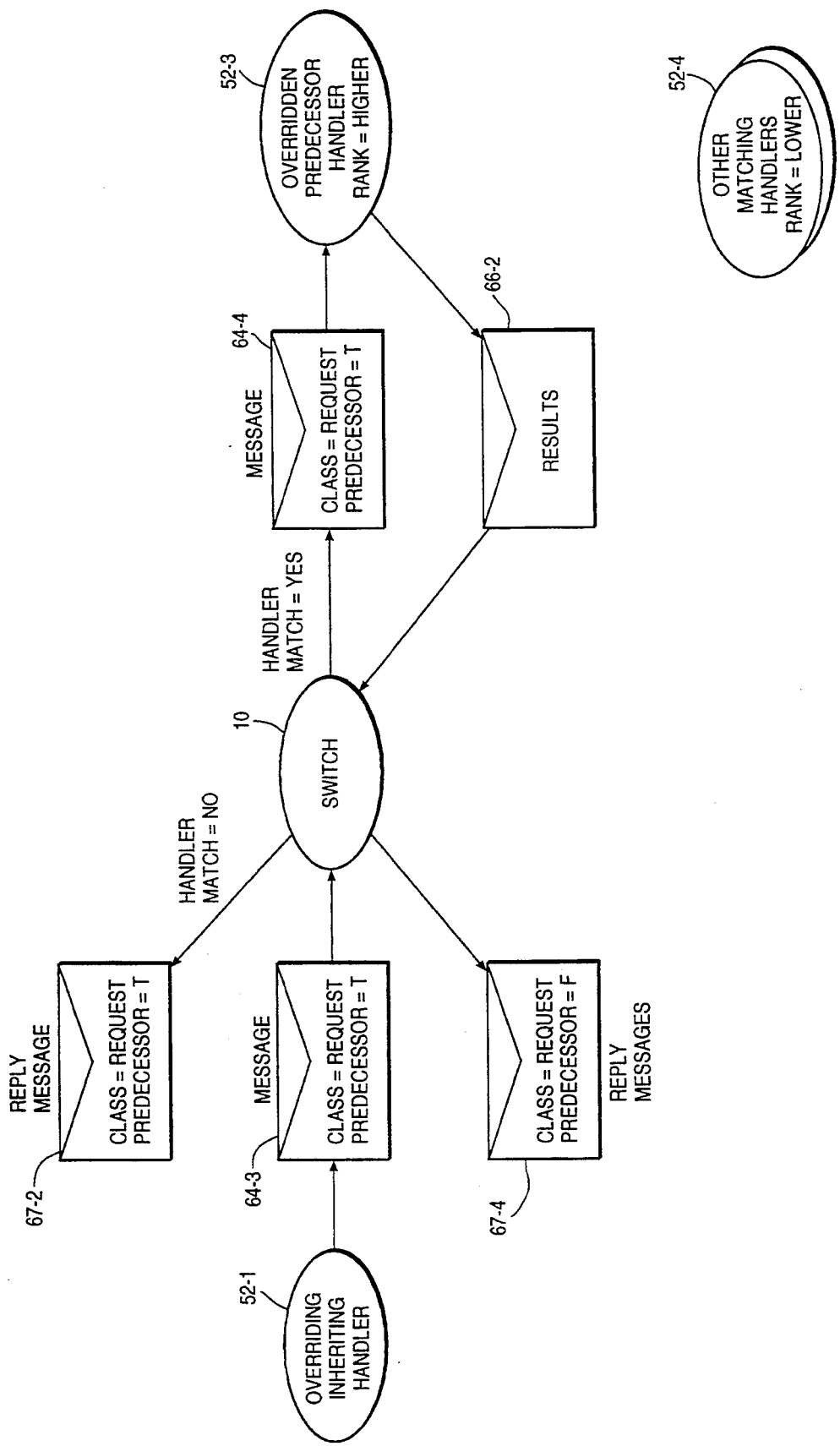

Referring now to FIG. 4a and 4b, two block diagrams summarizing the routing and disposition of an object oriented request message are shown. The object oriented request messages 64-1 to 64-4, the results 66-1 to 66-2 and the reply messages 67-1 to 67-4, relate to the object oriented request messages 64, the results 66 and the reply messages 67 of FIG. 1. Likewise, the handler processes 52-1 to 52-4 and the observer processes 54-1 to 54-4 relate to the handler processes 52 and the observer processes 54 of FIG. 1.

Referring first to FIG. 4a, initially, the object oriented request message with a message state attribute of "Created" and a message predecessor attribute of "False" 64-1 is sent to the apparatus for interprocess message switching of the present invention 10 as input. One copy of the object oriented request message with the message state attribute changed to "Sent" 64-2 and the message predecessor unchanged, is routed to one selected registered handler process 52-1 with the highest ranking. No copy of the object oriented request message 64-2 is routed to the other eligible handler processes with lower rankings 52-2. Copies of the object oriented request message with the message state attribute changed to "Sent" and the message predecessor attribute unchanged 64-2 are routed to all selected registered observer processes 54-1.

If the object operation is an inherited object operation and not overridden, the selected registered handler process 52-1 is the non-overridden overridden, the selected registered handler process 52-1 is the non-overridden predecessor handler process. If the object operation is an inherited but overridden, the selected registered handler process 52-1 is the overriding inheriting handler process, since the inheriting object type is used for matching when the message predecessor attribute is set to "False".

Referring now to FIG. 4b, upon completion of "preprocessing", the overriding inheriting handler process 52-1 resends the object oriented request message 64-3 as a "new" object oriented request message with the message state attribute changed to "Created" and the message predecessor attribute set to "True". Again, one copy of the object oriented request message with the message state attribute changed to "Sent" 64-4 and the message predecessor unchanged, is routed to one selected registered handler process 52-3 with the highest ranking. No copy of the "new" object oriented request message 64-4 is routed to the other eligible handler processes with lower rankings 52-4. Copies of the "new" object oriented request message with the message state attribute changed to "Sent" and the message predecessor attribute unchanged 64-4 are routed to all selected registered observer processes 54-3.

The selected registered handler process 52-3 is the overridden predecessor handler process, since the predecessor object type is used for matching, when the message predecessor attribute is set to "True".

Referring back to FIG. 4a, if no handler process registered is selected for the initial object oriented request message 64-1, the apparatus 10 updates the message state attribute to "Failed" and generates a reply message 67-1. The reply message 67-1 is routed back to the originating registered sender process 42. Referring to FIG. 4b again, similarly, if no handler process registered is selected for the "new" object oriented request message 64-3, the apparatus 10 also updates the message state attribute to "Failed" and generates a reply message 67-2. The reply message 67-2 is routed back to the "originating" overriding inheriting handler process 52-1.

Referring back to FIG. 4a, after the initial object oriented request message is handled by the non-overridden predecessor handler process 52-1, the handling result 66 is sent from the non-overridden predecessor handler process 52-1 to the apparatus 10 as input. The apparatus updates the message state attribute of the initial object oriented request message to "Handled" or "Failed" according to the handling result 66-1 received and generates a reply message 67-3. The reply message 67-3 is routed to the "originating" registered sender process 42. Copies of the reply message 67-3 are also routed to all selected registered observer processes 54-2.

Referring to FIG. 4b again, similarly, after the "new" object oriented request message is handled by the overridden predecessor handler process 52-3, the handling result 66-2 is sent from the overridden predecessor handler process 52-3 to the apparatus 10 as input. The apparatus updates the message state attribute of the "new" object oriented request message to "Handled" or "Failed" according to the handling result 66-2 received and generates a reply message 67-4, and resets the message predecessor attribute to "False". The reply message 67-4 is routed to the "originating" overriding inheriting handler process 52-1. Copies of the reply message 67-4 are also routed to all selected registered observer processes 54-4.

Referring back to FIG. 4a, upon completion of "postprocessing" by the non-overridden predecessor handler process 52-1 after receiving the reply message 67-4 to the "new" object oriented request message, the handling result 66-1 is sent from the overriding inheriting handler process 52-1 to the apparatus 10 as input. The apparatus updates the message state attribute of the object oriented request message to "Handled" or "Failed" according to the result 66-1 received and generates a reply message 67-3. The reply message 67-3 is routed to the "originating" registered sender process 42. Copies of the reply message 67-3 are eventually routed to all selected registered observer processes 54-2.

9. Notice Routing

Referring now to FIG. 5a and 5b, two block diagrams summarizing the routing and disposition of an object oriented notice message are shown. Like FIG. 4, the object oriented notice messages 65-1 to 65-6, the handler processes 52-1 to 52-4 and the observer processes 54-1 to 54-2 relate to the object oriented notice messages 65, and the handler processes 52 and the observer processes 54 in FIG. 1.

Referring first to FIG. 5a, initially, similar to an object oriented request message, the object oriented notice message with a message state attribute of "Created" and a message predecessor attribute of "False" 65-1 is sent to the apparatus for interprocess message switching of the present invention 10 as input. One copy of the object oriented notice message with the message state attribute changed to "Sent" and the message predecessor attribute unchanged 65-2 is also routed to one selected registered handler process 52-1. No copy of the object oriented notice message 65-2 is routed to the other eligible handler processes with lower rankings 52-2. Copies of the object oriented notice message with the message state attribute changed to "Sent" and the message predecessor attribute unchanged 65-2 are routed to all selected registered observer processes 54-1.

Similarly, if the object operation is inherited and not overridden, the selected registered handler process 52-1 is the non-overridden predecessor handler process. If the object operation is inherited and not overridden, the selected registered handler process 52-1 is the overriding inheriting handler process, since the inheriting object type is used for matching when the message predecessor attribute is set to "False".

Referring now to FIG. 5b, likewise, upon completion of "preprocessing", the overriding inheriting handler process 52-1 resends the object oriented notice message 65-3 as a "new" object oriented notice message with the message state attribute changed to "Created" and the message predecessor the message state attribute changed to "Sent" and the message predecessor unchanged 65-4, is routed to one selected registered handler process 52-3 with the highest ranking. No copy of the object oriented request message 65-2 is routed to the other eligible handler processes with lower rankings 52-4. Copies of the "new" object oriented notice message with the message state attribute changed to "Sent" and the message predecessor attribute unchanged 65-4 are routed to all selected registered observer processes 54-3.

The selected registered handler process 52-3 is the overridden predecessor handler process, since the predecessor object type is used for matching, when the message predecessor attribute is set to "True".

Referring back to FIG. 5a, unlike an object oriented request message, if neither handler process 52-1 nor observer processes 54-1 are selected for the initial object oriented notice message 65-1, the initial object oriented notice message is discarded 65-5. Referring to FIG. 5b again, similarly, if neither handler process 52-3 nor observer processes 54-2 are selected for the "new" object oriented notice message 65-3, the "new" object oriented notice message is also discarded 65-6.

Also unlike an object oriented request message, the selected handler processes 52-1, 52-3 do not send results from handling the object oriented notice messages 65-2, 65-4 to the apparatus 10, therefore no reply messages are generated for the "initial" object oriented notice message 65-1 and the "new" object oriented notice message 65-3.

10. Variations

While the apparatus for object oriented interprocess message switching of the present invention has been described in terms of a preferred embodiment, it will be understood that the present invention is not limited to the object oriented request and notice messages nor the handler and observer processes discussed herein. The present invention is also not limited to processes executing on different computers communicating across a network. Those skilled in the art will recognize that the invention can be practiced with modification and alteration within the spirit and scope of the appended claims to serve a wide variety of object oriented interprocess communication situations for processes being executed by the same computer and for processes being executed by different computers in a network.

What is claimed is:

1. In a network of computer systems comprising a sender process, a plurality of receiver processes, and a plurality of objects, a method for object oriented interprocess message switching between said sender process and said receiver processes, said method comprising the steps of:

generating and storing in retrievable storage locations on said network of computer systems in advance a plurality of merged object type-program type definitions from a plurality of program type definitions and a plurality of object type definitions, each of said program type definitions defining a program including the program's program type identifier, said receiver processes being executing instances of said defined programs, each of said object type definitions defining an object type including at least one explicit or inheriting handle or observe object operation of the object type, each of said explicit handle or observe object operations identifying one of said defined programs as the object operation's handle or observe program, each of said inheriting handling or observe object operation identifying another defined object type from which the handle or observe object operation is to be inherited with or without overriding of the handle or observe program, each of said objects having one of said defined object types, each of said merged object type-program type definitions defining one of said programs including the program's program type identifier and at least one handle or observe object operation performed by the program including all applicable object types of the handle or observe object operation;

registering a program type identifier for each of said receiver processes with an object oriented interprocess message switch on said network of computer systems, said switch having access to said stored merged object type-program type definitions;

selecting appropriate ones of said registered receiver processes to receive object oriented messages received from said sender process by said switch, each of said object oriented messages being addressed to at least one of said objects, said selections being performed using said merged object type-program type definitions in conjunction with said registered program type identifiers;

queuing copies of said received object oriented messages with selected receiver processes by said switch in response to said selection of said receiver processes;

signaling said selected receiver processes regarding the availability of said queued object oriented messages by said switch in response to said queuing of object oriented messages; and delivering said queued object oriented messages to requesting receiver processes by said switch, upon request of said signaled receiver process.

2. The method for object oriented interprocess message switching between a sender process and a plurality of receiver processes as set forth in claim 1, wherein each of said object type definitions comprises an object type identifier and at least one object operation signature.

3. The method for object oriented interprocess message switching between a sender process and a plurality of receiver processes as set forth in claim 2, wherein said object operation signatures comprise object operation handle signatures, and object operation observe signatures.

4. The method for object oriented interprocess message switching between a sender process and a plurality of receiver processes as set forth in claim 3, wherein said object operation handle/observe signatures comprise explicit object operation handle/observe signatures, and inheriting object operation handle/observe signatures.

5. The method for object oriented interprocess message switching between a sender process and a plurality of receiver processes as set forth in claim 4, wherein each of said object operation signatures comprises an object operation pattern, each of said object operation patterns comprising an object operation code and a set of object operation arguments.

6. The method for object oriented interprocess message switching between a sender process and a plurality of receiver processes as set forth in claim 5, wherein each of said explicit object operation signatures further comprises a program type identifier specifying one of said program type definitions defining a program that handles/observes said explicit object operation signature.

7. The method for object oriented interprocess message switching between a sender process and a plurality of receiver processes as set forth in claim 6, wherein each of said explicit object operation signatures further comprises an object operation disposition specifying disposition of a request of said object operation if said program identified by said specified program type definition is not being executed by any of said registered receiver processes, each of said object operation disposition being one of a plurality of dispositions comprising a disposition of "Start", a disposition of "Queue", and a disposition of "Discard", said "Discard" disposition being the defaulted disposition, if no disposition is specified.

8. The method for object oriented interprocess message switching between a sender process and a plurality of receiver processes as set forth in claim 7, wherein each of said inheriting object operation signatures comprises a predecessor object type identifier identifying a predecessor object type definition, where a predecessor program specified for the same object operation for said predecessor object type is to be inherited to handle/observe said inheriting object operation signature.

9. The method for object oriented interprocess message switching between a sender process and a plurality of receiver processes as set forth in claim 8, wherein some of said inheriting operation signatures further comprise overriding program type identifiers identifying overriding program type definitions defining overriding programs to handle/observe said overriding inheriting operation signatures, before said overriding inheriting operation signatures being handled/observed by said predecessor programs.

10. The method for object oriented interprocess message switching between a sender process and a plurality of receiver processes as set forth in claim 9, wherein said explicit operation signatures of said object type definition further comprises new object operation signatures that are not object operation signatures of said predecessor object type definitions.

11. The method for object oriented interprocess message switching between a sender process and a plurality of receiver processes as set forth in claim 1, wherein each of said object oriented messages received from said sender process comprises a plurality of message attributes, said message attributes comprising, an identifier for said received object oriented message, each of said message identifier comprising a sender computer identifier, a sender process identifier and a sender process specific message identifier; and at least one object oriented message attribute, said object oriented message attributes comprising a message object identifier attribute and a message object type attribute.

12. The method for object oriented interprocess message switching between a sender process and a plurality of receiver processes as set forth in claim 11, wherein each of said object oriented messages further comprises a message predecessor attribute comprising a binary indicator equaling one of two values, said values being "True " and "False".

13. The method for object oriented interprocess message switching between a sender process and a plurality of receiver processes as set forth in claim 12, wherein said message attributes in some of said received object oriented messages further comprise a message operation attribute comprising a message operation code, and an associated message operation argument attribute comprising a set of object operation arguments.

14. The method for object oriented interprocess message switching between a sender process and a plurality of receiver processes as set forth in claim 1, wherein, said step of selecting said registered receiver processes comprises the steps of matching message attributes in said received object oriented messages by said switch, against message attributes in object oriented message patterns registered by said receiver processes, matching said message attributes in said received object oriented messages by said switch, against merged object oriented message signatures, said merged object oriented message signatures being contained in said merged object type definitions, and matching program type identifiers contained in said merged object type-program type definitions having said matching merged object oriented message signatures, by said switch, against program type identifiers of said registered receiver processes;

said matchings are performed with message object types if said object oriented messages comprise message predecessor attributes equaling "False", and with predecessor object types if said object oriented messages comprise message predecessor attributes equaling "True", said message object types being contained in message object type attributes of said object oriented messages, and said predecessor object types being contained in said merged object operation definitions.

15. In a network of computer systems comprising a sender process, a plurality of receiver processes, and a plurality of objects, an apparatus for object oriented message switching between said sender process and said receiver processes, said apparatus comprising:

merging means for generating and storing in retrievable storage locations on said network of computer systems in advance a plurality of merged object type-program type definitions from a plurality of program type definitions and a plurality of object type definitions, each of said program type definitions defining a program including the program's program type identifier, said receiver processes being executing instances of said defined programs, each of said object type definitions defining an object type including at least one explicitly or inheriting handle or observe object operation of the object type, each of said explicit handle or observe object operations identifying one of said defined programs as the object operation's handle or observe program, each of said inheriting handling or observe object operation identifying another defined object type from which the handle or observe object operation is to be inherited with or without overriding of the handle or observe program, each of said objects having one of said defined object types, each of said merged object type-program type definitions defining one of said programs including the program's program type identifier and at least one handle or observe object operation performed by the program including all applicable object types of the handle or observe object operation, said merging means comprising a first interface for receiving said object type definitions and said program type definitions;

registering means for registering a program type identifier for each of said receiver processes, said registering means comprising a second interface for receiving registrations;

selecting means coupled to said registering means and having access to said stored merged object type-program type definitions for selecting appropriate ones of said registered receiver processes to receive object oriented messages received from said sender process, said selecting means comprising a third interface for receiving said object oriented messages from said sender process, each of said object oriented messages being addressed to at least one of said objects, said selecting means performing said selections using said merged object type-program type definitions in conjunction with said program type identifiers;

queuing means coupled to said selecting means, for queuing said received object oriented messages with selected receiver processes in response to said selection of receiver processes;

signaling means coupled to said registering means and said queuing means, for signaling said selected receiver processes regarding the availability of said queued object oriented messages in response to said queuing of object oriented messages; and delivering means coupled to said queuing means for delivering said queued object oriented messages upon request of said signaled receiver processes, to said requesting receiver processes, said delivering means comprising a fourth interface for receiving said delivery request.

16. The apparatus for object oriented interprocess message switching between a sender process and a plurality of receiver processes as set forth in claim 15, wherein each of said object type definitions comprises an object type identifier and at least one object operation signature.

17. The apparatus for object oriented interprocess message switching between a sender process and a plurality of receiver processes as set forth in claim 16, wherein said object operation signatures comprise object operation handle signatures, and object operation observe signatures.

18. The apparatus for object oriented interprocess message switching between a sender process and a plurality of receiver processes as set forth in claim 17, wherein said object operation handle/observe signatures comprise explicit object operation handle/observe signatures, and inheriting object operation handle/observe signatures.

19. The apparatus for object oriented interprocess message switching between a sender process and a plurality of receiver processes as set forth in claim 18, wherein each of said object operation signatures comprises an object operation pattern, each of said object operation patterns comprising an object operation code and a set of object operation arguments.

20. The apparatus for object oriented interprocess message switching between a sender process and a plurality of receiver processes as set forth in claim 19, wherein each of said explicit object operation signatures further comprises a program type identifier specifying one of said program type definitions defining a program that handles/observes said object operation signature.

21. The apparatus for object oriented interprocess message switching between a sender process and a plurality of receiver processes as set forth in claim 20, wherein each of said explicit object operation signatures further comprises an object operation disposition specifying disposition of a request of said object operation, if the program identified by said specified program type definition is not being executed by any of said registered receiver processes, each of said object operation disposition being one of a plurality of dispositions comprising a disposition of "Start", a disposition of "Queue", and a disposition of "Discard", said "Discard" disposition being the defaulted disposition, if no disposition is specified.

22. The apparatus for object oriented interprocess message switching between a sender process and a plurality of receiver processes as set forth in claim 21, wherein each of said inheriting object operation signatures comprises a predecessor object type identifier identifying a predecessor object type definition, where a predecessor program specified for the same object operation for said predecessor object type is to be inherited to handle/observe said inheriting object operation signature.

23. The apparatus for object oriented interprocess message switching between a sender process and a plurality of receiver processes as set forth in claim 22, wherein some of said inheriting operation signatures further comprise overriding program type identifiers identifying overriding program type definitions defining overriding programs to handle/observe said overriding inheriting operation signatures, before said overriding inheriting operation signatures being handled/observed by said predecessor programs.

24. The apparatus for object oriented interprocess message switching between a sender process and a plurality of receiver processes as set forth in claim 23, wherein said explicit operation signatures of said object type definition further comprises new object operation signatures that are not object operation signatures of said predecessor object type definitions.

25. The apparatus for object oriented interprocess message switching between a sender process and a plurality of receiver processes as set forth in claim 15, wherein each of said object oriented messages received from said sender process comprises a plurality of message attributes, said message attributes comprising,
  an identifier for said received object oriented message, each of said message identifier comprising a sender computer identifier, a sender process identifier and a sender process specific message identifier; and
  at least one object oriented message attribute, said object oriented message attributes comprising a message object identifier attribute comprising an object identifier and a message object type attribute comprising an object type identifier.

26. The apparatus for object oriented interprocess message switching between a sender process and a plurality of receiver processes as set forth in claim 25, wherein each of said object oriented messages further comprises a message predecessor attribute comprising a binary indicator equaling one of two values, said values being "True" and "False".

27. The apparatus for object oriented interprocess message switching between a sender process and a plurality of receiver processes as set forth in claim 26, wherein said message attributes in some of said received object oriented messages further comprise a message operation attribute comprising a message operation code and an associated message operation argument attribute comprising a set of object operation arguments.

28. The apparatus for object oriented interprocess message switching between a sender process and a plurality of receiver processes as set forth in claim 19, wherein,
  said selecting means for selecting said registered receiver processes comprises
    first matching means coupled to said second interface for matching message attributes in said received object oriented messages, against message attributes in object message patterns registered by said receiver processes,
    second matching means coupled to said first matching means for matching said message attributes in said received object oriented messages, against merged object oriented message signatures, said merged object oriented message signatures being contained in said merged object type definitions, and
    third matching means coupled to said second matching means for matching program type identifiers contained in said stored merged object type-program type definitions having said matching merged object oriented message signatures, against program type identifiers of said registered receiver processes; and
  said first, second, and third matching means perform said matchings with message object types if said object oriented messages comprise message predecessor attributes equaling "False", and with predecessor object types if said object oriented messages comprise message predecessor attributes equaling "True", said message object types being contained in message object type attributes of said object oriented messages, and said predecessor object types being contained in said merged object oriented message signatures.

* * * * *

UNITED STATES PATENT AND TRADEMARK OFFICE
CERTIFICATE OF CORRECTION

PATENT NO. : 5,379,426
DATED : January 3, 1995
INVENTOR(S) : Foss et al.

It is certified that error appears in the above-identified patent and that said Letters Patent is hereby corrected as shown below:

In column 24, claim 28 at line 22, please delete " object message " and insert -- object oriented message --.

Signed and Sealed this

Seventeenth Day of November, 1998

*Attest:*

BRUCE LEHMAN

*Attesting Officer*   *Commissioner of Patents and Trademarks*